(12) United States Patent
Maesono (10) Patent No.: US 10,877,932 B2
(45) Date of Patent: Dec. 29, 2020

(54) INFORMATION PROCESSING APPARATUS AND RECORDING MEDIUM

(71) Applicant: KYOCERA DOCUMENT SOLUTIONS INC., Osaka (JP)

(72) Inventor: Yuya Maesono, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 434 days.

(21) Appl. No.: 15/846,145

(22) Filed: Dec. 18, 2017

(65) Prior Publication Data

US 2018/0181585 A1 Jun. 28, 2018

(30) Foreign Application Priority Data

Dec. 22, 2016 (JP) ................................. 2016-248599

(51) Int. Cl.
*G06F 16/16* (2019.01)
*G06F 3/06* (2006.01)

(52) U.S. Cl.
CPC .......... *G06F 16/162* (2019.01); *G06F 3/0623* (2013.01); *G06F 3/0643* (2013.01); *G06F 3/0652* (2013.01); *G06F 3/0674* (2013.01)

(58) Field of Classification Search
CPC .............................. G06F 16/162; G06F 3/0623
See application file for complete search history.

(56) References Cited

U.S. PATENT DOCUMENTS

| 2002/0105863 A1* | 8/2002 | Lee ....................... G11B 27/036 |
| | | 369/30.05 |
| 2007/0067595 A1* | 3/2007 | Ghose ................... G06F 3/0611 |
| | | 711/167 |
| 2008/0215598 A1* | 9/2008 | Haga ....................... G06F 3/1205 |
| 2009/0268245 A1* | 10/2009 | Kitani ...................... G06F 21/80 |
| | | 358/1.15 |

FOREIGN PATENT DOCUMENTS

| JP | 2005-084974 A | 3/2005 |
| JP | 2007-241463 A | 9/2007 |
| JP | 2011-165080 A | 8/2011 |

\* cited by examiner

*Primary Examiner* — Hosain T Alam
*Assistant Examiner* — Anthony G Gemignani
(74) *Attorney, Agent, or Firm* — Li & Cai Intellectual Property (USA) Office (57) ABSTRACT

An information processing apparatus includes: a first memory that stores an information processing program; a second memory that stores a file-to-be-erased; and a processor. When executing the information processing program, the processor, when the processor executes a job which requires to generate a temporary file, selects a file having a size larger than a size of the temporary file out of one or more files-to-be-erased stored in the second memory, treats the selected file as a file-to-be-unerased, divides the file-to-be-unerased stored in the second memory into a first file having a size the same as the size of the temporary file and a second file being a rest, treats the second file as a file-to-be-erased, writes the temporary file over the first file (Continued)

as a file-to-be-unerased to thereby generate the temporary file, and after the temporary file is used in the job, treats the temporary file as a file-to-be-erased.

6 Claims, 4 Drawing Sheets

INFORMATION PROCESSING APPARATUS AND RECORDING MEDIUM

CROSS REFERENCE TO RELATED APPLICATION

This application claims the benefit of Japanese Priority Patent Application JP 2016-248599 filed Dec. 22, 2016, the entire contents of which are incorporated herein by reference.

BACKGROUND OF THE INVENTION

1. Field of the Invention

The present disclosure relates to an information processing apparatus capable of overwriting and erasing a file stored in a memory device, and a non-transitory computer readable recording medium that records a program therefor.

2. Description of Related Art

There is known a technique of writing meaningless data over a file stored in a memory device of an information processing apparatus one time or a plurality of times to thereby completely erase the file (overwriting erasure).

In the overwriting erasure process, a large load is applied to a processor since the processor writes meaningless data over a file one time or a plurality of times.

It is desirable to erase a file stored in a memory device by executing overwriting-erasure more efficiently.

SUMMARY OF THE INVENTION

According to an embodiment of the present disclosure, there is provided an information processing apparatus, including:
a first memory that stores an information processing program;
a second memory that stores a file-to-be-erased; and
a processor that executes the information processing program, in which
when the processor executes the information processing program, the processor,
when the processor executes a job which requires to generate a temporary file, selects a file having a size larger than a size of the temporary file out of one or more files-to-be-erased stored in the second memory, treats the selected file as a file-to-be-unerased,
divides the file-to-be-unerased stored in the second memory into a first file having a size the same as the size of the temporary file and a second file being a rest, treats the second file as a file-to-be-erased,
writes the temporary file over the first file as a file-to-be-unerased to thereby generate the temporary file, and
after the temporary file is used in the job, treats the temporary file as a file-to-be-erased.

According to an embodiment of the present disclosure, there is provided a non-transitory computer readable recording medium that records a program executable by a computer of an information processing apparatus,
the information processing apparatus including a memory that stores a file-to-be-erased, in which
the program causes the computer to:
when the processor executes a job which requires to generate a temporary file, select a file having a size larger than a size of the temporary file out of one or more files-to-be-erased stored in the second memory, treat the selected file as a file-to-be-unerased,
divide the file-to-be-unerased stored in the second memory into a first file having a size the same as the size of the temporary file and a second file being a rest, treat the second file as a file-to-be-erased,
write the temporary file over the first file as a file-to-be-unerased to thereby generate the temporary file, and
after the temporary file is used in the job, treat the temporary file as a file-to-be-erased.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, an embodiment of the present disclosure will be described with reference to the drawings.

In the present embodiment, for an example, an image forming apparatus (Multifunction Peripheral, MFP) is described as an information processing apparatus.

1. Hardware Configuration of Image Forming Apparatus

Figure 1:
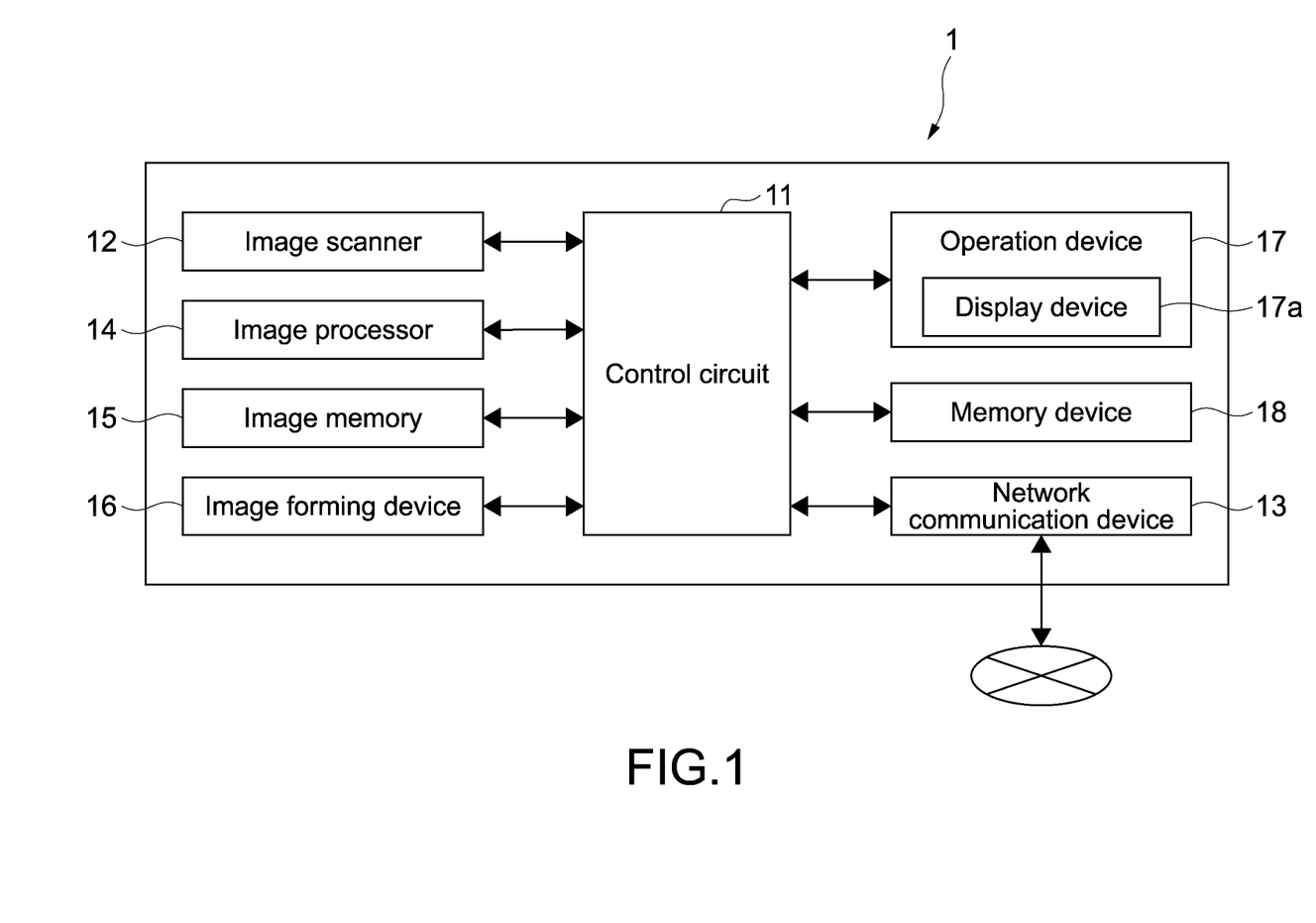
FIG. 1 shows an image forming apparatus according to an embodiment of the present disclosure.

FIG. 1 shows an image forming apparatus according to an embodiment of the present disclosure.

The information processing apparatus of the embodiment of the present disclosure is an image forming apparatus (for example, MFP, Multifunction Peripheral) and will be referred to as MFP hereinafter.

The MFP 1 includes a control circuit 11. The control circuit 11 includes a CPU (Central Processing Unit), a RAM (Random Access Memory), a ROM (Read Only Memory), dedicated hardware circuits, and the like and performs overall operational control of the MFP 1. A computer program that causes the MFP 1 to operate as the respective functional units (to be described later) is recorded in a non-transitory computer readable recording medium (first memory) such as a ROM.

The controller circuit 11 is connected to an image scanner 12, an image processor 14, an image memory 15, an image forming device 16, an operation device 17, a memory device 18 (second memory), a network communication device 13, and the like. The controller circuit 11 performs operational control of the respective devices connected thereto and sends/receives signals and data to/from those devices.

According to job execution instructions input by a user via the operation device 17 or a personal computer (not shown) connected to the network N, the controller circuit 11 controls drive and processing of mechanisms requisite for executing operational control of functions such as a scanner function, a printing function, and a copy function.

The image scanner 12 captures an image from a script.

The image processor 14 carries out image processing as necessary on image data of an image read by the image scanner 12. For example, the image processor 14 corrects shading of an image read by the image scanner 12 and carries out other image processing to improve the quality of the image to be formed.

The image memory 15 includes an area that temporarily stores data of a script image read by the image scanner 12 or data to be printed by the image forming device 16.

The image forming device 16 prints an image on a sheet or the like based on the image data obtained by the image scanner 12.

The operation device 17 includes a touch panel device and an operation key device that accept user's instructions on various operations and processing executable by the MFP 1. The touch panel device includes a display device 17a such as an LCD (Liquid Crystal Display) equipped with a touch panel.

The network communication device 13 is an interface used for connecting to the network.

The memory device 18 is a large-volume memory device such as an HDD (Hard Disk Drive) and a SSD (Solid State Drive) that stores a script image read by the image scanner 12, and the like.

2. Outline of Overwriting-Erasure Thread

"Overwriting erasure" is a technique of writing meaningless data over a file (file-to-be-erased) stored in a memory device of an information processing apparatus one time or a plurality of times (overwriting) to thereby completely erase the file (erasure).

In some cases, "overwriting erasure" may be not a job but a thread (referred to as overwriting-erasure thread) executed in the background. In the present embodiment, the controller circuit 11 of the MFP 1 executes an information processing program stored in a non-transitory computer readable recording medium such as a ROM to thereby execute an overwriting-erasure thread. The overwriting-erasure thread monitors a specific directory (referred to as trash directory). A file-to-be-erased in the overwriting-erasure thread is sorted into the trash directory. A "file-to-be-erased" is an unnecessary file in a print job or a copy job (temporary file). The overwriting-erasure thread overwrites and erases a file-to-be-erased sorted in a trash directory in the background. Specifically, for example, the overwriting-erasure thread does not execute overwriting erasure when a job is being executed, and executes overwriting erasure when a job is not being executed. Because of this, where a plurality of jobs are executed in series or where a time interval from the end of a job to the start of the next job is smaller than a time period necessary for overwriting erasure, files-to-be-erased may remain in a trash directory.

The overwriting-erasure thread writes meaningless data over the area of a memory device, in which a file-to-be-erased is stored, one time or a plurality of times. The number of times of overwriting and the value of an overwriting data value is determined in view of the required security and the trade-off performance. For example, there are a method of overwriting "0" one time (one-time overwriting), and a method of overwriting random data two times and then overwriting "0" one time (three-times overwriting). The area of a memory device in which overwriting erasure is completed is usable, and new data can be written in the area.

3. Functional Configuration of Image Forming Apparatus

Figure 2:
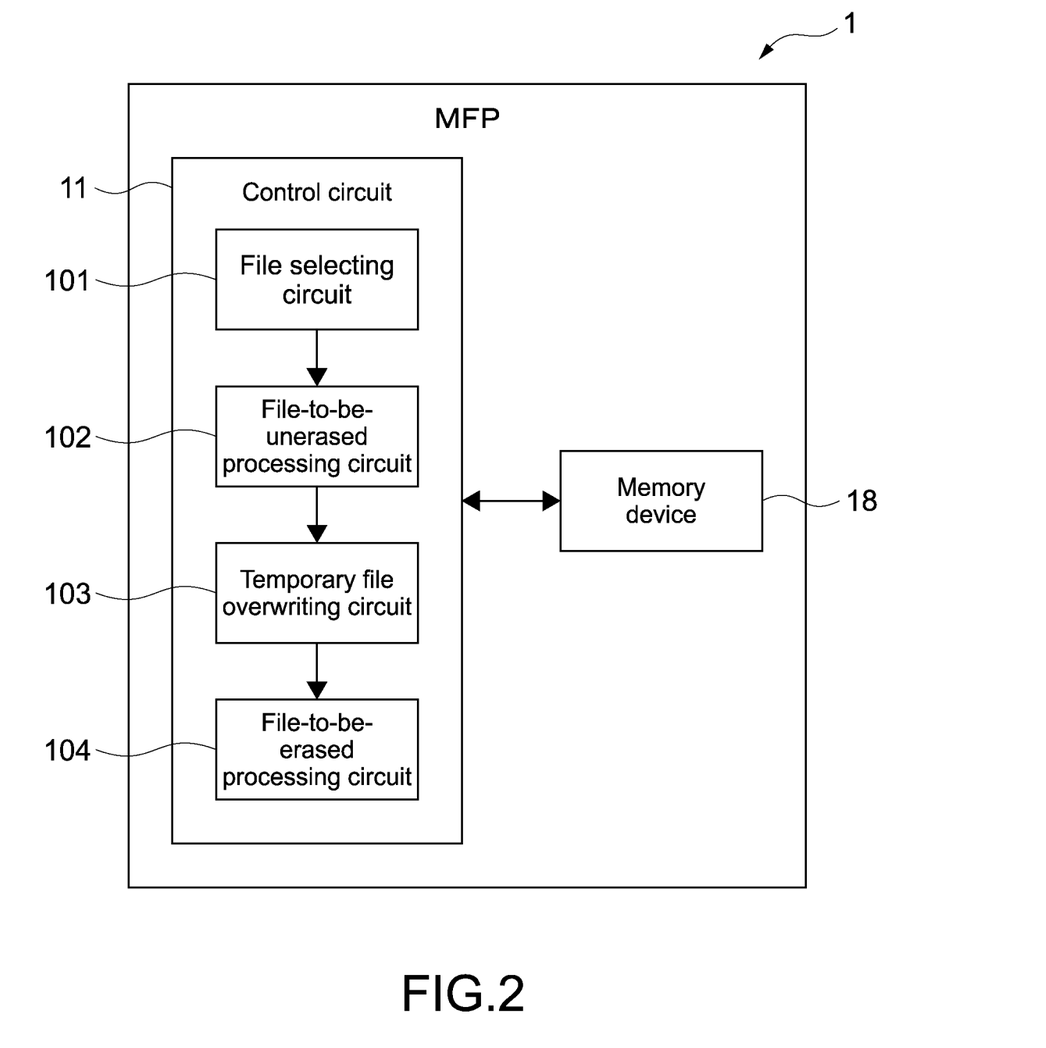
FIG. 2 shows a functional configuration of the image forming apparatus.

FIG. 2 shows a functional configuration of the image forming apparatus.

The processor of the controller circuit 11 of the MFP 1 loads an information processing program stored in the ROM, which is an example of a non-transitory computer readable recording medium, in the RAM and executes the information processing program to thereby function as the file selecting circuit 101, the file-to-be-unerased processing circuit 102, the temporary file overwriting circuit 103, and the file-to-be-erased processing circuit 104.

The file selecting circuit 101 selects, when a job which requires to generate a temporary file is executed, one file out of one or more files-to-be-erased.

The file-to-be-unerased processing circuit 102 treats the file selected by the file selecting circuit 101 as a file-to-be-unerased.

The temporary file overwriting circuit 103 writes a temporary file over the file-to-be-unerased to thereby generate a temporary file.

The file-to-be-erased processing circuit 104 treats, after the temporary file is used in the job, the temporary file as a file-to-be-erased.

4. Operation of Image Forming Apparatus

Figure 3:
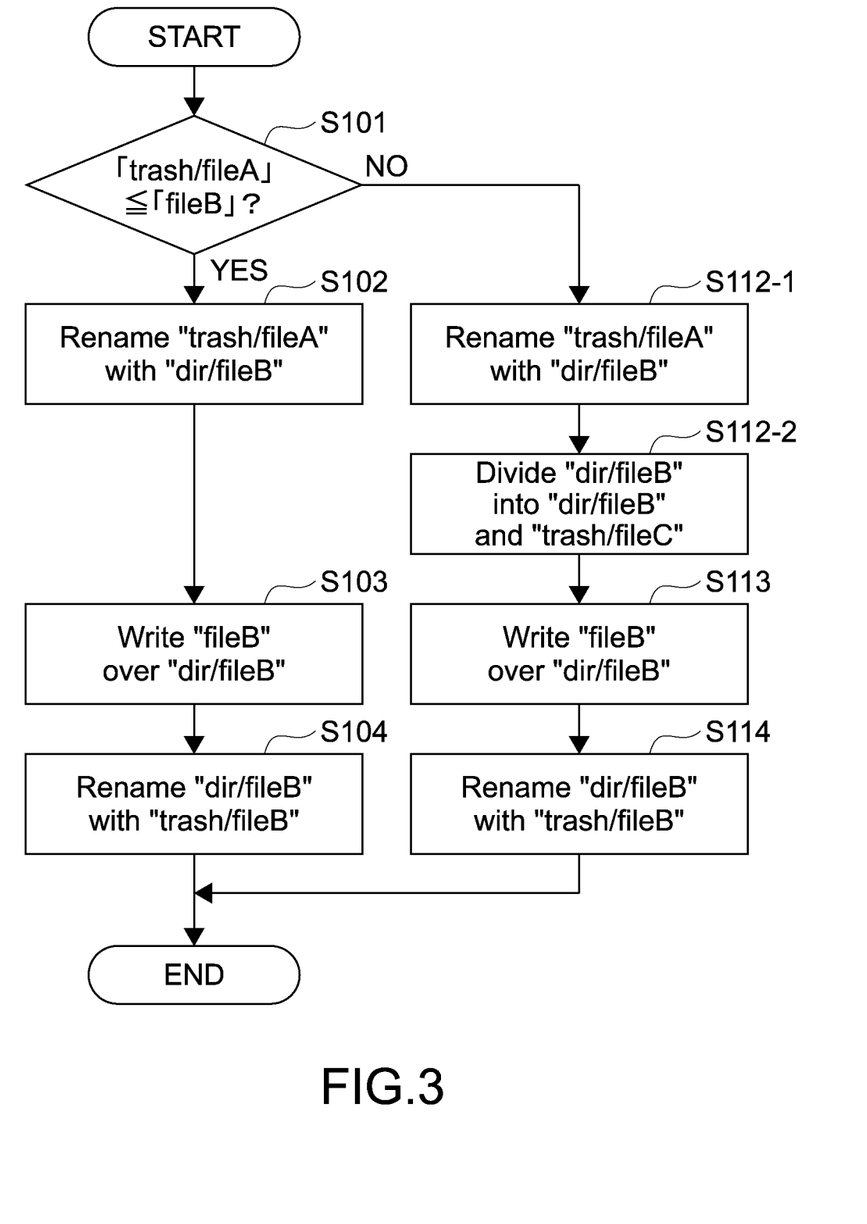
FIG. 3 shows an operational flow of the image forming apparatus.
Figure 4:
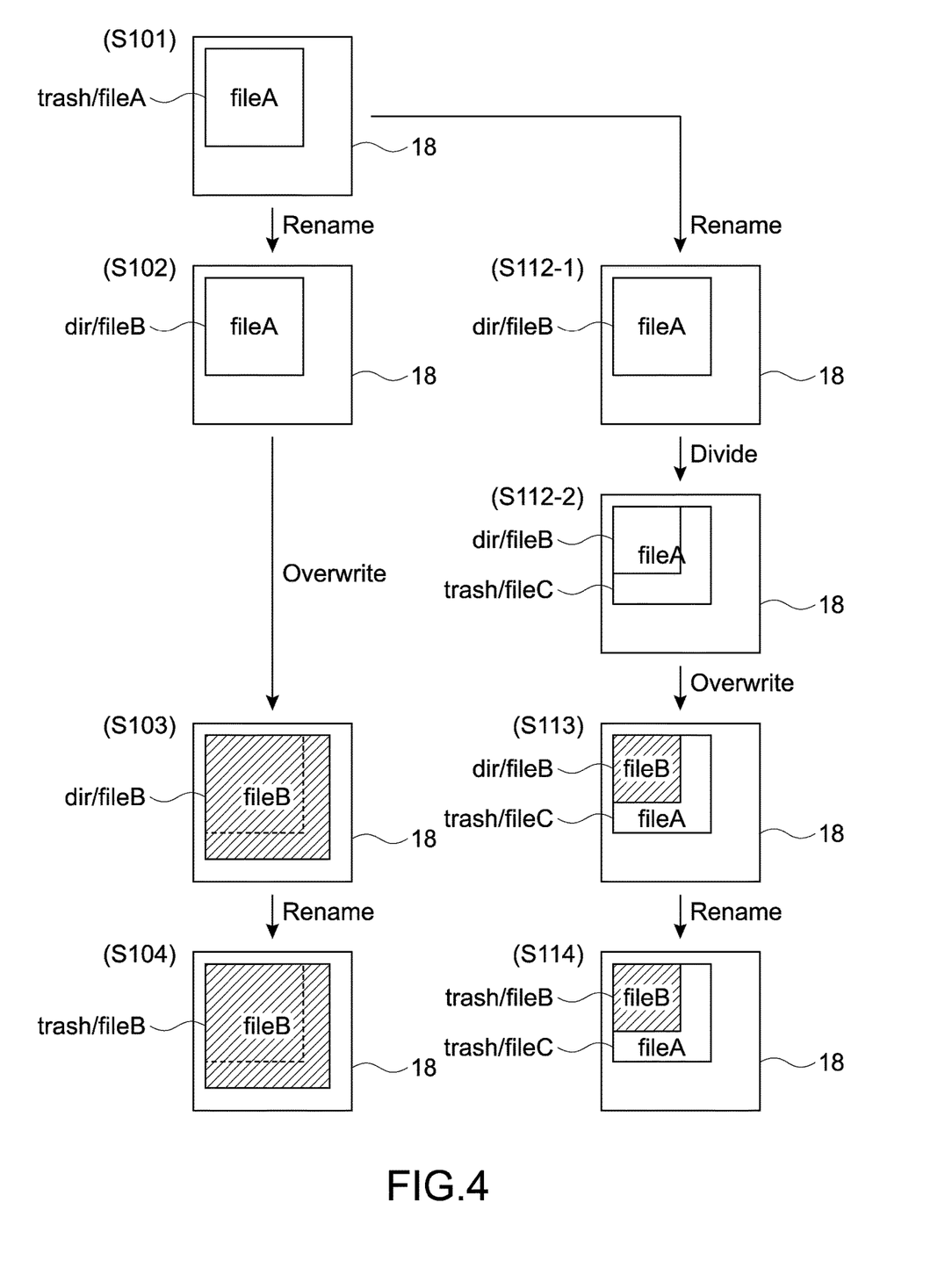
FIG. 4 schematically shows the operation of the image forming apparatus.

FIG. 3 shows an operational flow of the image forming apparatus. FIG. 4 schematically shows the operation of the image forming apparatus.

It is assumed that the MFP 1 starts to execute a job (print job, copy job, etc.) which requires to generate a temporary file. The "temporary file" is generated for working, temporarily stored, and to be erased after a job is completed. For example, in a print job, the MFP 1 prints printable data received from an external device such as a personal computer and then erases the printable data. This printable data is a "temporary file". In a copy job, the MFP 1 prints scan data captured by the image scanner and then erases the scan data. This scan data is a "temporary file". The "temporary file" is sorted into a general directory (described later) until a job is completed, and sorted into a trash directory as a "file-to-be-erased" after the job is completed. The MFP 1 can calculate an approximate size of a temporary file to be generated in advance. For example, in a print job, an approximate size of a temporary file can be calculated by obtaining the size of printable data from an external device and calculating the approximate size of a temporary file based on the size of obtained printable data. In a copy job, an approximate size of a temporary file can be calculated based on a size of scan data stored in a memory.

In the following description, the terms each having the following meaning will be used.

trash: A directory that means a trash directory. A file-to-be-erased is sorted into the trash directory.

dir: A directory that means a general directory. A file-to-be-unerased is sorted into the general directory.

file A: A file selected from one or more files-to-be-erased (below-described Step S101).

file B: A temporary file to be generated in a job to be executed this time.

trash/file A, trash/file B: A file name of a file (file A or file B) sorted into a trash directory (trash).

dir/file B: A file name of a file (file B) sorted into a general directory (dir).

The controller circuit 11 of the MFP 1 starts to execute a job which requires to generate a file "dir/file B", i.e., a temporary file. The file selecting circuit 101 selects one file "trash/file A" out of one or more files-to-be-erased sorted into a trash directory "trash" (Step S101). Specifically, where there is a file having a size equal to or less than the size of a temporary file to be generated out of the one or more files-to-be-erased sorted in the trash directory "trash" of the memory device 18, the file selecting circuit 101 selects the file (Step S101, YES). More specifically, where there are a plurality of files having sizes equal to or less than the size of the temporary file to be generated out of the one or more files-to-be-erased sorted in the trash directory "trash" of the memory device 18, the file selecting circuit 101 selects the file having the largest size.

The file-to-be-unerased processing circuit 102 treats the file "file A" corresponding to the file name "trash/file A" selected by the file selecting circuit 101 as a file-to-be-unerased. Specifically, the file-to-be-unerased processing circuit 102 renames "trash" of the file name "trash/file A", which means a trash directory, with "dir", which means a general directory. The file-to-be-unerased processing circuit 102 renames "file A" of the file name "trash/file A", which is a file-to-be-erased, with "file B", which is to be generated as a temporary file. In short, the file-to-be-unerased processing circuit 102 renames the file name "trash/file A" with "dir/file B" (Step S102). At this time, the physical data of the renamed file name "dir/file B" is the file "file A" as it is. In other words, the physical file "file A" is (virtually) moved from the trash directory "trash" to the general directory "dir".

The temporary file overwriting circuit 103 writes physical data, which is used to execute the job, over the file (physical data is "file A" as it is) corresponding to the (renamed) file name "dir/file B" of the file-to-be-unerased to thereby generate a temporary file "file B" (Step S103). Strictly speaking, the temporary file overwriting circuit 103 writes the physical data of the file "file B" in the area of the physical data of the file "file A" corresponding to the renamed file name "dir/file B" and in the other area (the size of the file "file A", which is physical data corresponding to the file name "dir/file B", is equal to or less than the size of the file "file B" used to execute the job). Since the size of the file "file A" is equal to or less than the size of the file "file B" (Step S101, YES), by writing the file "file B" over the file "file A", which is physical data corresponding to the file name "dir/file B", the entire file "file A" is erased. After that, the MFP 1 executes the job by using the file "file B", which is physically written in the area corresponding to the file name "dir/file B".

After the file "file B", which is physically written in the area corresponding to the file name "dir/file B", is used in the job, the file-to-be-erased processing circuit 104 treats the physical data in the area corresponding to the file name "dir/file B" as a file-to-be-erased. Specifically, the file-to-be-erased processing circuit 104 renames "dir", which means a general directory, of the file name "dir/file B" with "trash", which means a trash directory. In short, the file-to-be-erased processing circuit 104 renames the file name "dir/file B" with "trash/file B" (Step S104). In other words, the physical file "file B" is (virtually) moved from the general directory "dir" to the trash directory "trash".

The overwriting-erasure thread monitors the trash directory in the background, and overwrites and erases a file-to-be-erased in the trash directory in the background. In other words, the overwriting-erasure thread overwrites and erases the file "file B" corresponding to the file name "trash/file B", which is (virtually) moved to the trash directory "trash", in the background. The data corresponding to the file name "trash/file B" is physically the file "file B" written over the file "file A". Therefore, the file "file B" corresponding to the file name "trash/file B" is overwritten and erased, and, as a result, both the file "file A" and the file "file B" are simultaneously and completely erased.

Meanwhile, where there is no file having a size equal to or less than the size of a temporary file to be generated out of one or more files-to-be-erased sorted into the trash directory "trash" of the memory device 18, the file selecting circuit 101 selects a file having a size equal to or larger than the size of the temporary file (Step S101, NO).

The file-to-be-unerased processing circuit 102 treats the file "file A" corresponding to the file name "trash/file A" selected by the file selecting circuit 101 as a file-to-be-unerased. Specifically, the file-to-be-unerased processing circuit 102 renames the file name "trash/file A" with "dir/file B" (Step S112-1). Note that the operation of Step S112-1 is completely the same as the operation of Step S102.

The file-to-be-unerased processing circuit 102 divides the file (physical data is "file A" as it is) corresponding to the (renamed) file name "dir/file B" of the file-to-be-unerased into a first file having a size same as the size of the temporary file and a second file being the rest. The file-to-be-unerased processing circuit 102 still treats the first file as a file-to-be-unerased. Specifically, the file-to-be-unerased processing circuit 102 unchanges the file name "dir/file B" of the first file. Meanwhile, the file-to-be-unerased processing circuit 102 treats the second file as a file-to-be-erased. Specifically, the file-to-be-unerased processing circuit 102 renames the file name "dir/file B" of the second file with "trash/file C" (Step S112-2). In other words, the second file physically including the file "file A" is (virtually) moved from the general directory "dir" to the trash directory "trash".

The temporary file overwriting circuit 103 writes physical data, which is used to execute the job, over the file (first file) corresponding to the (renamed) file name "dir/file B" of the file-to-be-unerased to thereby generate a temporary file "file B" (Step S113). Strictly speaking, the temporary file overwriting circuit 103 writes the physical data of the file "file B" over the first file corresponding to the renamed file name "dir/file B". The first file is a part of the area of the physical data of the file "file A" (the size of the file "file A" is larger than the size of the file "file B" used to execute the job). By writing the file "file B" over the first file (a part of the file "file A"), the first file is erased. The first file is a part of the file "file A" (a part over which the file "file B" is written). After that, the MFP 1 executes the job by using the file "file B", which is physically written in the first file corresponding to the file name "dir/file B".

After the file "file B", which is physically written in the first file corresponding to the file name "dir/file B", is used in the job, the file-to-be-erased processing circuit 104 treats the physical data in the first file corresponding to the file name "dir/file B" as a file-to-be-erased. Specifically, the file-to-be-erased processing circuit 104 renames "dir", which means a general directory, of the file name "dir/file B" with "trash", which means a trash directory. In short, the file-to-be-erased processing circuit 104 renames the file name "dir/file B" with "trash/file B" (Step S114). In other words, the first file physically including the file "file B" is (virtually) moved from the general directory "dir" to the trash directory "trash".

Meanwhile, the second file being the rest, which is a part of the selected file "file A" excluding the first file (Step S101, NO), is a file-to-be-erased (file name "trash/file C") (Step S112-2). In other words, both the first file (file name "trash/ file B"), which physically includes the file "file B" written over a part of the "file A", and the second file (file name "trash/file C"), which physically includes the rest part of of the "file A", are files-to-be-erased.

The overwriting-erasure thread overwrites and erases the first file corresponding to the file name "trash/file B", which is (virtually) moved to the trash directory "trash", in the background. The data corresponding to the file name "trash/file B" is physically the file "file B" written over a part (first file) of the file "file A". Therefore, the first file corresponding to the file name "trash/file B" is overwritten and erased, and, as a result, both a part of the file "file A" and the file "file B" are simultaneously and completely erased.

Further, the overwriting-erasure thread overwrites and erases the second file corresponding to the file name "trash/file C", which is (virtually) moved to the trash directory "trash", in the background. The data corresponding to the file name "trash/file C" is physically the rest part of the file "file A" (second file). Therefore, the second file corresponding to the file name "trash/file C" is overwritten and erased, and, as a result, the rest part of the file "file A" is completely erased.

In the embodiment, the first file corresponding to the file name "trash/file B" and the second file corresponding to the file name "trash/file C" can be erased independently.

5. Conclusion

In a typical overwriting erasure technique, random data may be written over a target data area a plurality of times, and therefore a large load is applied to a processor. Where a large load is applied to a processor, the job executing speed may be decreased. In view of this, a typical overwriting-erasure thread confirms whether there is a job or not before executing overwriting erasure, and executes overwriting erasure after a job being executed is completed. Because of this, when a plurality of jobs are executed in series or in other cases, overwriting erasure cannot be executed during the jobs that continue in series. In addition, during job processing, temporary files are generated and erased (moved to trash directory) a plurality of times, and therefore files-to-be-erased are accumulated. As a result, the area, in which files-to-be-erased are accumulated, cannot be used until overwriting erasure is completed, and therefore the disk may get full.

In view of the above-mentioned circumstances, according to the present embodiment, one file-to-be-erased sorted into a trash directory is selected, and a temporary file is written over the selected file-to-be-erased. Then, after the temporary file is used, the temporary file is treated as a file-to-be-erased (moved to trash directory). As a result, by overwriting and erasing the temporary file, the temporary file and the selected file-to-be-erased can be simultaneously and completely erased. In short, according to the present embodiment, a temporary file is written over a file-to-be-erased. Accordingly, the number of times of executing overwriting erasure is reduced, and the used area of the memory device is smaller.

According to the present embodiment, since a temporary file and a selected file-to-be-erased are simultaneously erased, the number of times of executing overwriting erasure is small. For a specific example, a case of generating, overwriting, and erasing a "file A" (three-times overwriting) and generating, overwriting, and erasing a "file B" (three-times overwriting) will be described. According to a typical overwriting erasure method, the "file A" is written (one time), the "file A" is overwritten and erased (three times), the "file B" is written (one time), and the "file B" is overwritten and erased (three times). It is necessary to write data eight times in total. Meanwhile, according to the present embodiment, the "file A" is written (one time), the "file B" is written over the "file A" (one time), and the "file B" is overwritten and erased (three times). It is necessary to write data only five times in total. As described above, since the number of times of executing overwriting erasure is decreased, a load applied to a processor can be reduced. Further, the number of times of writing data in a device (SSD, etc.), which has the restricted number of times of writing, and therefore the lifetime of an SSD or the like can be substantially made longer.

Further, according to the present embodiment, a temporary file is not written in an available area of a memory device, but written over a file-to-be-erased. Therefore the used area of the memory device is reduced, and the disk may hardly get full. Further, since the used area of the memory device is small, if a disk almost gets full, a job is highly likely to be executed reliably and the performance is less affected.

Further, according to the present embodiment, where there are a plurality of files having sizes equal to or less than the size of the temporary file out of the one or more files-to-be-erased, the file selecting circuit 101 selects a file having the largest size. Since a temporary file is written over a file having the largest size, the area other than the file-to-be-erased, in which the temporary file is written, can be small. As a result, the used area of the memory device can be further reduced.

Further, according to the present embodiment, where there is no file having a size equal to or less than the size of the temporary file out of the one or more files-to-be-erased, the file selecting circuit 101 selects a file having a size larger than the size of the temporary file.

Where a file having a size larger than the size of the temporary file is selected, it is necessary to reliably erase the area of the file, over which the temporary file is not written, by overwriting at the time of completing a job. For example, when obtaining the size of the file, it is necessary to obtain not the actual size of the selected file but the effective size for the temporary file. Further, the area of the selected file, over which a temporary file is not written, may be useless because the area is unreusable until the unnecessary temporary file is moved to the trash directory at the time of completing a job.

In view of the above, according to the embodiment, when writing a temporary file over a file having a size larger than a size of the temporary file, the file having the size larger than the size of the temporary file is divided into a first file having a size the same as the size of the temporary file and a second file being the rest. As a result, the temporary file is written over the entire area of the first file. Therefore it is possible to treat the entire first file as the temporary file. Further, because the second file is independent of the first file, only the second file may be remained as a file-to-be-erased.

Further, according to the embodiment, since a temporary file is written over a file having a size larger than the size of the temporary file, it is necessary to write the temporary file in an available area of a memory device. As a result, the used area of the memory device can be further reduced.

It should be understood by those skilled in the art that various modifications, combinations, sub-combinations and alterations may occur depending on design requirements and other factors insofar as they are within the scope of the appended claims or the equivalents thereof

What is claimed is:

1. An information processing apparatus, comprising:
a first memory that stores an information processing program;
a second memory that stores a file-to-be-erased; and
a processor that executes the information processing program, wherein
when the processor executes the information processing program, the processor,
when the processor executes a job which requires to generate a temporary file, selects a file having a size larger than a size of the temporary file out of one or more files-to-be-erased sorted into a trash directory of the second memory,
treats the selected file as a file-to-be-unerased by moving the selected file into a general directory of the second memory, wherein, in a first file name of the selected file to be moved into the general directory, a name that means a file-to-be-erased is renamed with a name that means a file to be generated as the temporary file, and thereby a second file name is generated, the selected file thereby having the second file name,
divides the file-to-be-unerased having the second file name into a first file having a size the same as the size of the temporary file and a second file being a rest,
unchanges the second file name of the first file,
treats the second file as a file-to-be-erased by moving the second file into a trash directory of the second memory, wherein, in the second file name of the second file to be moved into the trash directory, the name that means the file to be generated as the temporary file is renamed with a name that means a file-to-be-erased, and thereby a third file name is generated, the second file thereby having the third file name,
writes the temporary file over the first file as a file-to-be-unerased to thereby generate the temporary file, the temporary file thereby having the second file name, and
after the temporary file is used in the job, treats the temporary file as a file-to-be-erased by moving the temporary file into the trash directory of the second memory.

2. The information processing apparatus according to claim 1, wherein
when the processor executes the information processing program, the processor,
(i) where there is no file having a size equal to or less than a size of the temporary file out of the one or more files-to-be-erased, selects a file having a size larger than the size of the temporary file, and
(ii) where there is a file having a size equal to or less than the size of the temporary file out of the one or more files-to-be-erased, selects a file having a size equal to or less than the size of the temporary file out of the one or more files-to-be-erased stored in the second memory,
treats the selected file as a file-to-be-unerased,
writes the temporary file over the file as a file-to-be-unerased to thereby generate the temporary file, and
after the temporary file is used in the job, treats the temporary file as a file-to-be-erased.

3. The information processing apparatus according to claim 2, wherein
when the processor executes the information processing program, the processor,
where there are a plurality of files having sizes equal to or less than the size of the temporary file out of the one or more files-to-be-erased stored in the second memory, selects a file having a largest size.

4. The information processing apparatus according to claim 1, wherein
when the processor executes the information processing program, the processor,
when generating the second file name from the first file name, further renames a name that means the trash directory with a name that means the general directory,
when generating the third file name from the second file name, further renames the name that means the general directory with the name that means the trash directory, and
when treating the temporary file having the second file name as the file-to-be-erased, renames the name that means the general directory with the name that means the trash directory.

5. A non-transitory computer readable recording medium that records a program executable by a computer of an information processing apparatus,
the information processing apparatus including a memory that stores a file-to-be-erased, wherein
the program causes the computer to:
when the processor executes a job which requires to generate a temporary file, select a file having a size larger than a size of the temporary file out of one or more files-to-be-erased sorted into a trash directory of the second memory,
treat the selected file as a file-to-be-unerased by moving the selected file into a general directory of the second memory, wherein, in a first file name of the selected file to be moved into the general directory, a name that means a file-to-be-erased is renamed with a name that means a file to be generated as the temporary file, and thereby a second file name is generated, the selected file thereby having the second file name,
divide the file-to-be-unerased having the second file name into a first file having a size the same as the size of the temporary file and a second file being a rest,
unchange the second file name of the first file,
treat the second file as a file-to-be-erased by moving the second file into a trash directory of the second memory, wherein, in the second file name of the second file to be moved into the trash directory, the name that means the file to be generated as the temporary file is renamed with a name that means a file-to-be-erased, and thereby a third file name is generated, the second file thereby having the third file name,
write the temporary file over the first file as a file-to-be-unerased to thereby generate the temporary file, the temporary file thereby having the second file name, and
after the temporary file is used in the job, treat the temporary file as a file-to-be-erased by moving the temporary file into the trash directory of the second memory.

6. The non-transitory computer readable recording medium according to claim 5, wherein
the program causes the computer to when generating the second file name from the first file name, further rename a name that means the trash directory with a name that means the general directory, when generating the third file name from the second file name, further rename the name that means the general directory with the name that means the trash directory, and when treating the temporary file having the second file name as the file-to-be-erased, rename the name that means the general directory with the name that means the trash directory.

\* \* \* \* \*